(12) United States Patent
Dutterer

(10) Patent No.: US 12,465,982 B2
(45) Date of Patent: Nov. 11, 2025

(54) TRACK SAW INCLUDING PLUNGE LOCKOUT MECHANISM

(71) Applicant: TECHTRONIC CORDLESS GP, Anderson, SC (US)

(72) Inventor: David E. Dutterer, Belton, SC (US)

(73) Assignee: Techtronic Cordless GP, Anderson, SC (US)

( * ) Notice: Subject to any disclaimer, the term of this patent is extended or adjusted under 35 U.S.C. 154(b) by 281 days.

(21) Appl. No.: 17/679,689

(22) Filed: Feb. 24, 2022

(65) Prior Publication Data

US 2023/0264275 A1 Aug. 24, 2023

(51) Int. Cl.
*B23D 45/16* (2006.01)
*B23D 47/02* (2006.01)

(52) U.S. Cl.
CPC .......... *B23D 45/16* (2013.01); *B23D 47/02* (2013.01)

(58) Field of Classification Search
CPC .. B27B 9/02; B27B 9/04; B27B 11/02; H01H 25/006; B23D 59/002; B23D 45/02; B23D 45/16; B23D 47/02; B23D 47/04; B23D 61/02; B25F 5/003; B25H 1/0078
See application file for complete search history.

(56) References Cited

U.S. PATENT DOCUMENTS

| | | |
|---|---|---|
| 1,888,679 A | 11/1932 | Walter |
| 1,911,045 A | 5/1933 | Tinnen |
| 1,932,511 A | 10/1933 | Clarke |
| 2,346,961 A | 4/1944 | Gundelfinger et al. |
| 2,629,410 A | 2/1953 | Edward |
| 2,677,399 A | 5/1954 | Getsinger |
| 2,818,892 A | 1/1958 | Price |
| 2,819,742 A | 1/1958 | Blachly |
| 2,854,043 A | 9/1958 | Ray |
| 2,911,960 A * | 11/1959 | Benz ................. F01L 13/00 123/41 R |
| 2,929,419 A | 3/1960 | Johnson |
| 3,011,530 A | 12/1961 | Ellard |

(Continued)

FOREIGN PATENT DOCUMENTS

| | | |
|---|---|---|
| AU | 2010101055 A4 | 11/2010 |
| CN | 201067843 Y | 6/2008 |

(Continued)

*Primary Examiner* — Adam J Eiseman
*Assistant Examiner* — Samuel A Davies
(74) *Attorney, Agent, or Firm* — Michael Best & Friedrich LLP

(57) ABSTRACT

A lockout mechanism for use with a saw, the lockout mechanism including a lockout actuator, a lever, and a pin. The lockout actuator is movable between a safety position in which the lockout actuator inhibits actuation of a trigger and a use position in which the lockout actuator permits actuation of the trigger. The lever is coupled to and movable with the lockout actuator and the pin. The pin is movable between a first position and a second position. The first and second positions correspond with the safety position and use position, respectively. In the first position, the pin is configured to inhibit a motor housing from being moved from a raised position toward a plunged position. In the second position, the pin is configured to permit the motor housing to be moved from the raised position toward the plunged position.

25 Claims, 6 Drawing Sheets

(56) References Cited

U.S. PATENT DOCUMENTS

| | | |
|---|---|---|
| 3,298,407 A | 1/1967 | Scott |
| 3,450,177 A | 6/1969 | Siegal et al. |
| 3,586,077 A | 6/1971 | Pease |
| 3,623,518 A | 11/1971 | Nicotra |
| 3,645,307 A | 2/1972 | Stocker |
| 3,730,042 A | 5/1973 | Price |
| 3,830,130 A | 8/1974 | Moore |
| 3,991,643 A | 11/1976 | Girardin |
| 4,058,150 A | 11/1977 | Pennington |
| 4,059,038 A | 11/1977 | Rietema |
| 4,078,309 A | 3/1978 | Wilson |
| 4,176,572 A | 12/1979 | Pennington |
| 4,202,233 A | 5/1980 | Larson |
| 4,224,855 A | 9/1980 | Des Roches |
| 4,245,390 A | 1/1981 | Bond |
| 4,307,513 A | 12/1981 | Genge |
| 4,353,165 A | 10/1982 | Albery |
| 4,356,748 A | 11/1982 | Tilton |
| 4,381,103 A | 4/1983 | Ferdinand et al. |
| 4,418,902 A | 12/1983 | Genge |
| 4,450,627 A | 5/1984 | Morimoto |
| 4,453,438 A | 6/1984 | Zelli |
| 4,463,644 A | 8/1984 | Ferdinand et al. |
| 4,539,881 A | 9/1985 | Maier |
| 4,607,555 A | 8/1986 | Erhard |
| 4,619,170 A | 10/1986 | Maier et al. |
| 4,628,608 A | 12/1986 | Kuhlmann et al. |
| 4,677,750 A | 7/1987 | Maier et al. |
| 4,694,720 A | 9/1987 | Brickner, Jr. et al. |
| 4,751,865 A | 6/1988 | Buckalew |
| 4,777,726 A | 10/1988 | Flowers |
| 4,856,394 A | 8/1989 | Clowers |
| 4,919,384 A | 4/1990 | Grimberg |
| 4,999,916 A | 3/1991 | Sistare |
| 5,010,651 A | 4/1991 | Techter et al. |
| 5,062,339 A | 11/1991 | Campos |
| 5,075,976 A | 12/1991 | Young |
| 5,136,910 A | 8/1992 | Kuhn et al. |
| 5,138,759 A | 8/1992 | Gruetzmacher |
| 5,201,863 A | 4/1993 | Peot |
| 5,206,999 A | 5/1993 | Stone |
| 5,235,753 A | 8/1993 | Stumpf |
| 5,239,756 A | 8/1993 | Matzo et al. |
| 5,271,155 A | 12/1993 | Fuchs et al. |
| 5,287,779 A | 2/1994 | Metzger, Jr. |
| 5,287,780 A | 2/1994 | Metzger, Jr. et al. |
| 5,365,822 A | 11/1994 | Stapleton et al. |
| 5,381,602 A | 1/1995 | Matzo et al. |
| 5,398,456 A | 3/1995 | Kleider |
| 5,427,006 A | 6/1995 | Finley |
| 5,452,515 A | 9/1995 | Schilling |
| 5,454,167 A | 10/1995 | Albery |
| 5,540,129 A | 7/1996 | Kalber et al. |
| 5,561,907 A | 10/1996 | Campbell et al. |
| 5,570,511 A | 11/1996 | Reich et al. |
| 5,669,371 A | 9/1997 | Rupprecht et al. |
| 5,675,898 A | 10/1997 | Kalber et al. |
| 5,676,126 A | 10/1997 | Rupprecht et al. |
| 5,678,314 A | 10/1997 | Braunbach et al. |
| 5,794,351 A | 8/1998 | Campbell et al. |
| 5,815,933 A | 10/1998 | Staniszewski |
| 5,822,864 A | 10/1998 | Campbell et al. |
| 5,911,482 A | 6/1999 | Campbell et al. |
| 6,055,734 A | 5/2000 | McCurry et al. |
| 6,094,827 A | 8/2000 | Campbell |
| 6,108,912 A | 8/2000 | Radigan |
| 6,108,916 A | 8/2000 | Zeiler et al. |
| 6,142,051 A | 11/2000 | Garuglieri |
| 6,202,311 B1 | 3/2001 | Nickels, Jr. |
| 6,237,230 B1 | 5/2001 | Campbell et al. |
| 6,276,064 B1 | 8/2001 | Campbell |
| 6,301,790 B1 | 10/2001 | Zeiler et al. |
| 6,367,790 B2 | 4/2002 | Ocklenburg et al. |
| 6,375,557 B1 | 4/2002 | Spangenberg et al. |
| 6,397,716 B1 | 6/2002 | Garuglieri |
| 6,412,179 B1 | 7/2002 | Ende |
| 6,502,316 B2 | 1/2003 | Campbell et al. |
| 6,543,143 B2 | 4/2003 | Moore et al. |
| 6,574,874 B2 | 6/2003 | Hartmann |
| 6,588,112 B2 | 7/2003 | Zeiler et al. |
| 6,591,509 B2 | 7/2003 | LeBlanc |
| 6,601,305 B1 | 8/2003 | Fukuoka |
| 6,681,493 B2 | 1/2004 | Mori et al. |
| 6,691,418 B1 | 2/2004 | Lewin et al. |
| 6,708,411 B2 | 3/2004 | Kani |
| 6,758,123 B2 | 7/2004 | Svetlik et al. |
| 6,848,683 B2 | 2/2005 | Foshag et al. |
| 6,878,050 B2 | 4/2005 | Wendt et al. |
| 6,886,259 B2 | 5/2005 | Kani |
| 6,945,523 B2 | 9/2005 | Degen |
| 6,953,394 B2 | 10/2005 | Wendt et al. |
| 6,991,009 B1 | 1/2006 | Wedeward |
| 7,039,548 B2 | 5/2006 | Takano et al. |
| 7,073,266 B2 | 7/2006 | Moore et al. |
| 7,093,828 B2 | 8/2006 | Murray et al. |
| 7,096,588 B2 | 8/2006 | Zeiler et al. |
| 7,114,714 B2 | 10/2006 | Wong |
| 7,191,526 B2 | 3/2007 | Zeiler et al. |
| 7,198,042 B2 | 4/2007 | Harris |
| 7,219,434 B2 | 5/2007 | Moore et al. |
| 7,219,885 B2 | 5/2007 | Nardozza |
| 7,249,548 B2 | 7/2007 | Blanco et al. |
| 7,281,332 B2 | 10/2007 | Niwa et al. |
| 7,300,339 B2 | 11/2007 | Gaul et al. |
| 7,308,764 B2 | 12/2007 | Zeiler et al. |
| 7,434,321 B2 | 10/2008 | Niwa et al. |
| 7,458,301 B2 | 12/2008 | Yu |
| 7,497,152 B2 | 3/2009 | Zeiler et al. |
| 7,516,551 B2 | 4/2009 | Yoshida |
| 7,523,691 B2 | 4/2009 | Terashima et al. |
| 7,549,229 B2 | 6/2009 | Aoyama et al. |
| 7,555,976 B2 | 7/2009 | Logan et al. |
| 7,562,456 B2 | 7/2009 | Roehm et al. |
| 7,621,206 B2 | 11/2009 | Makropoulos |
| D612,715 S | 3/2010 | Weinberg et al. |
| 7,757,592 B2 | 7/2010 | Wilson |
| 7,778,796 B2 | 8/2010 | Takano et al. |
| 7,823,293 B2 | 11/2010 | Walmsley et al. |
| 7,850,154 B2 | 12/2010 | Feuge |
| 7,856,723 B2 | 12/2010 | Thomas et al. |
| 7,866,051 B2 | 1/2011 | Niwa |
| 7,896,323 B2 | 3/2011 | Murray et al. |
| 7,905,166 B2 | 3/2011 | Thomas et al. |
| 7,908,952 B2 | 3/2011 | Wilson et al. |
| 7,926,397 B2 | 4/2011 | Logan et al. |
| 7,958,641 B1 | 6/2011 | Ende |
| 7,975,388 B2 | 7/2011 | Fuchs et al. |
| 8,056,243 B2 | 11/2011 | Sargeant et al. |
| 8,060,235 B2 | 11/2011 | Johnson et al. |
| 8,061,043 B2 * | 11/2011 | Allen .................. B27B 9/02 |
| | | 30/388 |
| 8,181,559 B1 | 5/2012 | End |
| 8,201,483 B2 | 6/2012 | Wilson |
| 8,209,872 B1 | 7/2012 | Ende |
| 8,220,372 B2 | 7/2012 | Janson |
| 8,230,768 B2 | 7/2012 | Ozawa et al. |
| 8,267,389 B2 | 9/2012 | Roesch et al. |
| 8,272,133 B2 | 9/2012 | Wascow |
| 8,313,095 B2 | 11/2012 | Kloepfer et al. |
| 8,359,959 B2 | 1/2013 | Aoyama et al. |
| 8,439,339 B2 | 5/2013 | Roesch et al. |
| 8,479,401 B2 | 7/2013 | Barkley |
| 8,485,078 B2 | 7/2013 | Janson |
| 8,588,959 B2 | 11/2013 | Johnson et al. |
| 8,616,108 B2 | 12/2013 | Lukas et al. |
| 8,640,346 B2 | 2/2014 | Allen et al. |
| 8,641,024 B2 | 2/2014 | Murray et al. |
| 8,661,957 B2 | 3/2014 | Aoyama et al. |
| 8,671,811 B2 | 3/2014 | Rybka |
| 8,684,052 B2 | 4/2014 | Breitenbach |
| 8,985,566 B2 | 3/2015 | Chuang |
| 9,038,516 B2 | 5/2015 | Chen et al. |
| 9,044,869 B2 * | 6/2015 | Xing .................. B27G 19/04 |
| 9,156,184 B2 | 10/2015 | Stoffel |

(56) References Cited

U.S. PATENT DOCUMENTS

| | | | |
|---|---|---|---|
| 9,308,626 | B2 | 4/2016 | Chuang |
| 9,316,352 | B2* | 4/2016 | Thorson ............... F16N 11/04 |
| 9,427,848 | B1 | 8/2016 | Murray et al. |
| 9,475,140 | B2 | 10/2016 | Kume et al. |
| 9,522,479 | B2 | 12/2016 | Boehme et al. |
| 9,623,583 | B2 | 4/2017 | Sinzig et al. |
| 9,744,650 | B2 | 8/2017 | Kregloski |
| 9,751,139 | B2 | 9/2017 | Groth |
| 9,908,256 | B2 | 3/2018 | Sinzig et al. |
| 9,937,638 | B2 | 4/2018 | Numata |
| 9,981,402 | B2 | 5/2018 | Cuenca |
| 10,005,199 | B2 | 6/2018 | Sinzig et al. |
| 10,099,398 | B2 | 10/2018 | Wang |
| D846,365 | S | 4/2019 | Wang |
| 10,272,544 | B1 | 4/2019 | Murray et al. |
| 10,363,682 | B2 | 7/2019 | Firth |
| 10,442,058 | B2 | 10/2019 | Wang |
| 10,456,944 | B2 | 10/2019 | Ursell et al. |
| 10,471,624 | B2 | 11/2019 | Baxivanelis |
| 10,486,251 | B2 | 11/2019 | Nakashima |
| 10,518,343 | B2 | 12/2019 | Ogino et al. |
| 12,083,613 | B2* | 9/2024 | Dutterer ............... B23D 59/005 |
| 2003/0233925 | A1 | 12/2003 | Makropoulos |
| 2003/0233926 | A1 | 12/2003 | Makropoulos |
| 2005/0061128 | A1 | 3/2005 | Caughlin et al. |
| 2006/0011032 | A1 | 1/2006 | Brown et al. |
| 2006/0011034 | A1 | 1/2006 | Gehret et al. |
| 2006/0086219 | A1 | 4/2006 | Zeiler et al. |
| 2006/0107536 | A1 | 5/2006 | Buck et al. |
| 2006/0117579 | A1 | 6/2006 | Zeiler et al. |
| 2006/0117920 | A1 | 6/2006 | Zeiler et al. |
| 2006/0191387 | A1 | 8/2006 | Weber et al. |
| 2006/0283024 | A1 | 12/2006 | Wilson et al. |
| 2007/0007702 | A1 | 1/2007 | Brandl |
| 2007/0144319 | A1 | 6/2007 | Jones |
| 2007/0157781 | A1 | 7/2007 | Wilson et al. |
| 2007/0157782 | A1 | 7/2007 | Hetcher et al. |
| 2007/0180710 | A1 | 8/2007 | Moore et al. |
| 2007/0222130 | A1 | 9/2007 | Leinbach et al. |
| 2008/0041209 | A1 | 2/2008 | Li |
| 2009/0133559 | A1 | 5/2009 | Sargeant et al. |
| 2009/0308218 | A1 | 12/2009 | Raff et al. |
| 2010/0156015 | A1 | 6/2010 | Klein et al. |
| 2011/0025265 | A1 | 2/2011 | Mochida et al. |
| 2011/0072943 | A1 | 3/2011 | Chen |
| 2011/0083540 | A1 | 4/2011 | Xing et al. |
| 2011/0219628 | A1 | 9/2011 | Harrison et al. |
| 2012/0079931 | A1 | 4/2012 | Hansen |
| 2012/0132049 | A1 | 5/2012 | Bokelaar |
| 2012/0247299 | A1 | 10/2012 | Wilson |
| 2012/0317823 | A1* | 12/2012 | Vantran ............... B23D 51/04 |
| | | | 30/376 |
| 2013/0318801 | A1* | 12/2013 | Nicholson ............... B27B 9/02 |
| | | | 30/377 |
| 2014/0026725 | A1 | 1/2014 | Makropoulos |
| 2014/0047967 | A1 | 2/2014 | Makropoulos |
| 2014/0103595 | A1 | 4/2014 | Yang |
| 2014/0290458 | A1 | 10/2014 | Sinzig et al. |
| 2014/0345436 | A1 | 11/2014 | Behrisch |
| 2015/0047484 | A1 | 2/2015 | Lane |
| 2015/0059186 | A1 | 3/2015 | Bermes et al. |
| 2015/0135922 | A1 | 5/2015 | Bokelaar |
| 2015/0321374 | A1 | 11/2015 | Ursell et al. |
| 2015/0375389 | A1 | 12/2015 | Semann |
| 2016/0243631 | A1 | 8/2016 | Brewster et al. |
| 2016/0279764 | A1 | 9/2016 | Thomas |
| 2017/0120353 | A1 | 5/2017 | Tennant et al. |
| 2017/0159793 | A1 | 6/2017 | Schorpp et al. |
| 2017/0348829 | A1 | 12/2017 | Kregloski |
| 2018/0071955 | A1 | 3/2018 | Rybka et al. |
| 2018/0093335 | A1 | 4/2018 | Hart |
| 2018/0290328 | A1 | 10/2018 | Zuler |
| 2018/0345523 | A1 | 12/2018 | Ursell et al. |
| 2018/0361612 | A1 | 12/2018 | Wang |
| 2019/0039258 | A1 | 2/2019 | Lee |
| 2019/0044415 | A1 | 2/2019 | Hatfield et al. |
| 2019/0076940 | A1 | 3/2019 | Crabb et al. |
| 2019/0091779 | A1 | 3/2019 | Crabb et al. |
| 2019/0143555 | A1 | 5/2019 | Nakashima |
| 2019/0217446 | A1 | 7/2019 | Wang |
| 2019/0217447 | A1 | 7/2019 | Wang |
| 2019/0232400 | A1 | 8/2019 | Ender |
| 2019/0329337 | A1* | 10/2019 | Owens ............... B27B 9/00 |
| 2019/0381632 | A1 | 12/2019 | Wang et al. |
| 2019/0388984 | A1 | 12/2019 | Kuragano |
| 2020/0023541 | A1 | 1/2020 | Strempke et al. |
| 2020/0061797 | A1* | 2/2020 | Mok ............... B23D 45/16 |
| 2020/0086405 | A1 | 3/2020 | Ogino et al. |
| 2020/0180117 | A1 | 6/2020 | Kloepfer et al. |
| 2020/0261992 | A1* | 8/2020 | Frank ............... B27B 9/02 |
| 2020/0398454 | A1* | 12/2020 | Zsuponyo ............... B27B 9/02 |
| 2021/0060811 | A1 | 3/2021 | Kani et al. |
| 2022/0161455 | A1 | 5/2022 | VanDaalwyk et al. |
| 2023/0158586 | A1 | 5/2023 | Rau et al. |
| 2023/0294184 | A1 | 9/2023 | Kour et al. |

FOREIGN PATENT DOCUMENTS

| | | |
|---|---|---|
| CN | 100448635 C | 1/2009 |
| CN | 101537595 B | 4/2011 |
| CN | 102407571 A | 4/2012 |
| CN | 102744458 A | 10/2012 |
| CN | 203031036 U | 7/2013 |
| CN | 203140888 U | 8/2013 |
| CN | 102814549 B | 9/2014 |
| CN | 104511949 A | 4/2015 |
| CN | 204524406 U | 8/2015 |
| CN | 103418842 B | 9/2015 |
| CN | 204914075 U | 12/2015 |
| CN | 205020943 U | 2/2016 |
| CN | 205184946 U | 4/2016 |
| CN | 205200693 U | 5/2016 |
| CN | 105921811 A | 9/2016 |
| CN | 205888243 U | 1/2017 |
| CN | 104722837 B | 4/2017 |
| CN | 206425620 U | 8/2017 |
| CN | 208392223 U | 1/2019 |
| CN | 208614252 U | 3/2019 |
| CN | 209350095 U | 9/2019 |
| CN | 210475706 U | 5/2020 |
| DE | 2413816 A1 | 10/1975 |
| DE | 2542322 A1 | 3/1977 |
| DE | 7820060 U1 | 10/1978 |
| DE | 2829297 A1 | 1/1980 |
| DE | 3007310 C2 | 8/1983 |
| DE | 3315169 A1 | 11/1983 |
| DE | 3308199 A1 | 9/1984 |
| DE | 2547459 C2 | 11/1984 |
| DE | 3420183 A1 | 12/1985 |
| DE | 3434469 A1 | 3/1986 |
| DE | 8604618 U1 | 4/1986 |
| DE | 3500371 A1 | 7/1986 |
| DE | 3540410 A1 | 5/1987 |
| DE | 3609809 A1 | 9/1987 |
| DE | 8706730 U1 | 9/1987 |
| DE | 3633655 A1 | 4/1988 |
| DE | 8803627 U1 | 5/1988 |
| DE | 8807584 | 7/1988 |
| DE | 3718232 A1 | 9/1988 |
| DE | 3807516 C1 | 6/1989 |
| DE | 8905442 U1 | 6/1989 |
| DE | 3806814 A1 | 9/1989 |
| DE | 9003772 U1 | 6/1990 |
| DE | 3906300 A1 | 8/1990 |
| DE | 3912307 A1 | 10/1990 |
| DE | 3919702 A1 | 12/1990 |
| DE | 3943134 A1 | 7/1991 |
| DE | 4023101 A1 | 1/1992 |
| DE | 9016090 U1 | 4/1992 |
| DE | 9112286 U1 | 2/1993 |
| DE | 4130174 A1 | 3/1993 |
| DE | 4212460 A1 | 10/1993 |
| DE | 9319867 U1 | 4/1994 |
| DE | 9420679 U1 | 2/1995 |

(56) References Cited

FOREIGN PATENT DOCUMENTS

| | | |
|---|---|---|
| DE | 19507062 A1 | 8/1995 |
| DE | 3606525 C2 | 5/1996 |
| DE | 29510061 U1 | 10/1996 |
| DE | 3104733 C3 | 1/1997 |
| DE | 3635159 C2 | 5/1998 |
| DE | 29801989 U1 | 8/1998 |
| DE | 29809921 U1 | 10/1998 |
| DE | 19751599 A1 | 5/1999 |
| DE | 29907474 U1 | 7/1999 |
| DE | 29820244 U1 | 3/2000 |
| DE | 20012674 U1 | 2/2001 |
| DE | 20017862 U1 | 2/2001 |
| DE | 20100087 U1 | 3/2001 |
| DE | 10025077 A1 | 4/2001 |
| DE | 20002160 U1 | 6/2001 |
| DE | 10007294 A1 | 8/2001 |
| DE | 10011740 A1 | 9/2001 |
| DE | 20119603 U1 | 2/2002 |
| DE | 10159485 A1 | 7/2002 |
| DE | 20213291 U1 | 10/2002 |
| DE | 20023085 U1 | 12/2002 |
| DE | 20219273 U1 | 2/2003 |
| DE | 19507286 C2 | 6/2003 |
| DE | 10360373 B3 | 3/2005 |
| DE | 102004017420 A1 | 11/2005 |
| DE | 202006004228 U1 | 6/2006 |
| DE | 102006034136 A1 | 4/2007 |
| DE | 202005019483 U1 | 4/2007 |
| DE | 202006006140 U1 | 8/2007 |
| DE | 102006057951 A1 | 6/2008 |
| DE | 102006060822 A1 | 6/2008 |
| DE | 102008059838 A1 | 6/2010 |
| DE | 102009060088 A1 | 8/2010 |
| DE | 102004002275 B4 | 5/2011 |
| DE | 102006011280 B4 | 8/2011 |
| DE | 10334757 B4 | 2/2012 |
| DE | 102011103476 A1 | 12/2012 |
| DE | 202012009204 U1 | 1/2013 |
| DE | 202013100111 U1 | 2/2013 |
| DE | 102011114375 A1 | 3/2013 |
| DE | 102011116873 A1 | 4/2013 |
| DE | 102011089555 A1 | 6/2013 |
| DE | 102006025137 B4 | 8/2013 |
| DE | 202013104555 U1 | 10/2013 |
| DE | 102005021789 B4 | 3/2014 |
| DE | 202014103166 U1 | 8/2014 |
| DE | 102014010486 A1 | 1/2016 |
| DE | 102015225392 A1 | 6/2017 |
| DE | 202018105381 U1 | 10/2018 |
| DE | 202018107178 U1 | 1/2019 |
| DE | 202018100612 U1 | 5/2019 |
| DE | 102018112324 A1 | 11/2019 |
| EP | 0012404 B1 | 5/1983 |
| EP | 0204023 B1 | 6/1989 |
| EP | 0246417 B1 | 9/1990 |
| EP | 0525437 A2 | 2/1993 |
| EP | 0459121 B1 | 11/1994 |
| EP | 0598088 B1 | 9/1995 |
| EP | 0496047 B1 | 2/1996 |
| EP | 0712686 A1 | 5/1996 |
| EP | 0765716 A1 | 4/1997 |
| EP | 0642896 B1 | 10/1997 |
| EP | 1279467 A1 | 1/2003 |
| EP | 0925893 B1 | 4/2004 |
| EP | 0990492 B1 | 11/2004 |
| EP | 1193036 B1 | 5/2005 |
| EP | 1361019 B1 | 10/2005 |
| EP | 1418018 B1 | 5/2006 |
| EP | 1457299 B1 | 8/2006 |
| EP | 1522394 B1 | 7/2008 |
| EP | 1892056 B1 | 5/2009 |
| EP | 2082832 A2 | 7/2009 |
| EP | 1964648 B1 | 12/2010 |
| EP | 2075080 B1 | 5/2011 |
| EP | 2581166 B1 | 9/2014 |
| EP | 2335892 B1 | 5/2015 |
| EP | 2412499 B1 | 7/2015 |
| EP | 2567796 B1 | 9/2015 |
| EP | 2412489 B1 | 6/2016 |
| EP | 2581167 B1 | 7/2016 |
| EP | 2412486 B1 | 10/2016 |
| EP | 2638997 B1 | 11/2016 |
| EP | 2250005 B1 | 3/2017 |
| EP | 2881228 B1 | 3/2017 |
| EP | 2762282 B1 | 3/2018 |
| EP | 2638995 B1 | 4/2019 |
| EP | 2638996 B1 | 5/2019 |
| EP | 2881229 B1 | 5/2019 |
| EP | 2641710 B1 | 7/2019 |
| FR | 2527497 A1 | 12/1983 |
| GB | 2302058 A | 1/1997 |
| GB | 2362128 A | 11/2001 |
| JP | H047101 U | 1/1992 |
| JP | 2000071120 A | 3/2000 |
| JP | 2007136794 A | 6/2007 |
| JP | 4204749 B2 | 1/2009 |
| WO | WO9213672 A1 | 8/1992 |
| WO | 9301922 A1 | 2/1993 |
| WO | WO9309913 A1 | 5/1993 |
| WO | WO02060642 A1 | 8/2002 |
| WO | WO2003000451 A2 | 1/2003 |
| WO | WO2009095300 A1 | 8/2009 |
| WO | WO2009147152 A1 | 12/2009 |
| WO | WO2011047663 A2 | 4/2011 |
| WO | WO2011085681 A1 | 7/2011 |
| WO | WO2015007032 A1 | 1/2015 |
| WO | WO2015014038 A1 | 2/2015 |
| WO | WO2015036604 A1 | 3/2015 |
| WO | 2016128232 A1 | 8/2016 |
| WO | 2016128233 A1 | 8/2016 |
| WO | WO2018148792 A1 | 8/2018 |
| WO | WO2019063685 A1 | 4/2019 |
| WO | WO2019238511 A2 | 12/2019 |
| WO | 2021116479 A1 | 6/2021 |

* cited by examiner

TRACK SAW INCLUDING PLUNGE LOCKOUT MECHANISM

FIELD OF THE DISCLOSURE

The present invention relates to track saws, and more particularly to lockout mechanisms for track saws.

BACKGROUND OF THE DISCLOSURE

Some saws may be plunged prior or during operation of the saw. Periodically, saws require blade exchanges when blades become dull. During a blade exchange, the blade is typically moved to a plunged position with a portion of the blade protruding below a shoe of the saw. Accordingly, it is often desired to include a lockout mechanism to inhibit inadvertent plunging and rotation of the saw blade. Such a lockout mechanism must be easy for a user to operate and afford the user options to operate the saw for any given cutting or blade exchange operation.

SUMMARY OF THE DISCLOSURE

The disclosure provides, in one aspect, a saw comprising a shoe, a motor housing, a motor, a trigger, and a trigger lockout mechanism. The motor housing is pivotably coupled to the shoe and is movable between a raised position in which a saw blade is located above the shoe and a plunged position in which at least a portion of the saw blade is located beneath the shoe. The motor is located within the motor housing and is configured to rotate the saw blade. The trigger is configured to activate the motor in response to being actuated. The trigger lockout mechanism includes a lockout actuator, a lever, and a pin. The lockout actuator is movable between a safety position in which the lockout actuator inhibits actuation of the trigger and a use position in which the lockout actuator permits actuation of the trigger. The lever has a first end coupled to and movable with the lockout actuator. The lever has a second end opposite the first end. The pin is coupled to the second end of the lever and is movable with the lever between a first position and a second position. The first position corresponds with the safety position of the lockout actuator. In the first position, the pin is configured to inhibit the motor housing from being moved from the raised position toward the plunged position. The second position corresponds with the use position of the lockout actuator. In the second position, the pin is configured to permit the motor housing to be moved from the raised position toward the plunged position.

The disclosure provides, in another independent aspect, a saw comprising a shoe, a motor housing, a motor, a lockout mechanism, and a mode selector. The motor housing is pivotable coupled to the shoe and is movable between a raised position in which a saw blade is located above the shoe and at least one plunged position in which at least a portion of the saw blade is located beneath the shoe. The motor is located within the motor housing and is configured to rotate the saw blade. The lockout mechanism includes a lockout actuator and a pin. The pin is coupled to the lockout actuator and is movable by the lockout actuator between a first position and a second position. In the first position, the pin is configured to inhibit the motor housing from being moved from the raised position toward the at least one plunged position. In the second position, the pin is configured to permit the motor housing to be moved from the raised position toward the at least one plunged position. The mode selector is operable to adjust the pin between a plunge position, a blade exchange position, and a scoring position. In the plunge position, the pin is configured to permit the motor housing to be moved from the raised position toward a first plunged position defining a maximum plunge depth of the saw blade. In the blade exchange position, the pin is configured to permit the motor housing to be moved from the raised position toward a second plunged position defining a blade exchange plunge depth of the saw blade that is less than the maximum plunge depth. In the scoring position, the pin is configured to permit the motor housing to be moved from the raised position toward a third plunged position defining a scoring plunge depth of the saw blade that is less than the blade exchange depth.

The disclosure provides, in another independent aspect, a track saw assembly including a saw and a track. The saw comprises a shoe, a motor housing, a motor, a trigger, a lockout mechanism, and a mode selector. The motor housing is pivotable coupled to the shoe and is movable between a raised position in which a saw blade is located above the shoe and at least one plunged position in which at least a portion of the saw blade is located beneath the shoe. The motor is located within the motor housing and is configured to rotate the saw blade. The trigger is configured to activate the motor in response to being actuated. The lockout mechanism includes a lockout actuator, a lever, and a pin. The lockout actuator is movable between a safety position and a use position. In the safety position, the lockout actuator inhibits actuation of the trigger. In the use position, the lockout actuator permits actuation of the trigger. The lever has a first end coupled to and movable with the lockout actuator. The lever has a second end opposite the first end. The pin is coupled to the second end of the lever and is movable with the lever between a first position and a second position. The first position corresponds with the safety position of the lockout actuator. In the first position, the pin is configured to inhibit the motor housing from being moved from the raised position toward the at least one plunged position. The second position corresponds with the use position of the lockout actuator. In the second position, the pin is configured to permit the motor housing to be moved from the raised position toward the at least one plunged position. The mode selector is operable to adjust the pin between a plunge position and a blade exchange position. In the plunge position, the pin is configured to permit the motor housing to be moved from the raised position toward a first plunged position defining a maximum plunge depth of the saw blade. In the blade exchange position, the pin is configured to permit the motor housing to be moved from the raised position toward a second plunged position defining a blade exchange plunge depth of the saw blade that is less than the maximum plunge depth. The shoe is slidable along the track to perform a cutting operation with the saw on a workpiece upon which the track is supported.

Other features and aspects of the invention will become apparent by consideration of the following detailed description and accompanying drawings.

Figure 1:
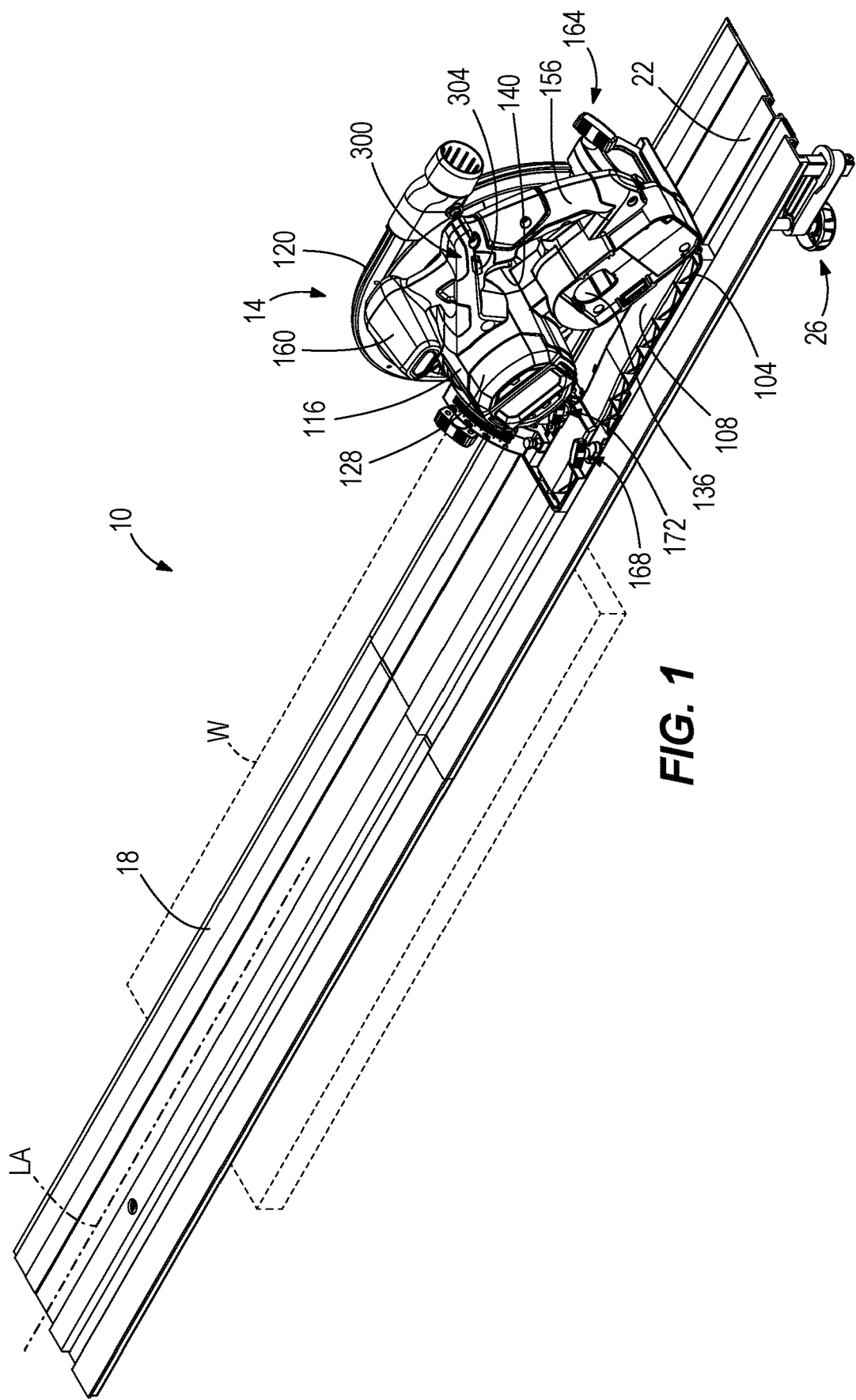
FIG. 1 is a perspective view of a track saw assembly including a track and a saw slidably supported upon the track.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," comprising, "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

DETAILED DESCRIPTION

Figure 5:
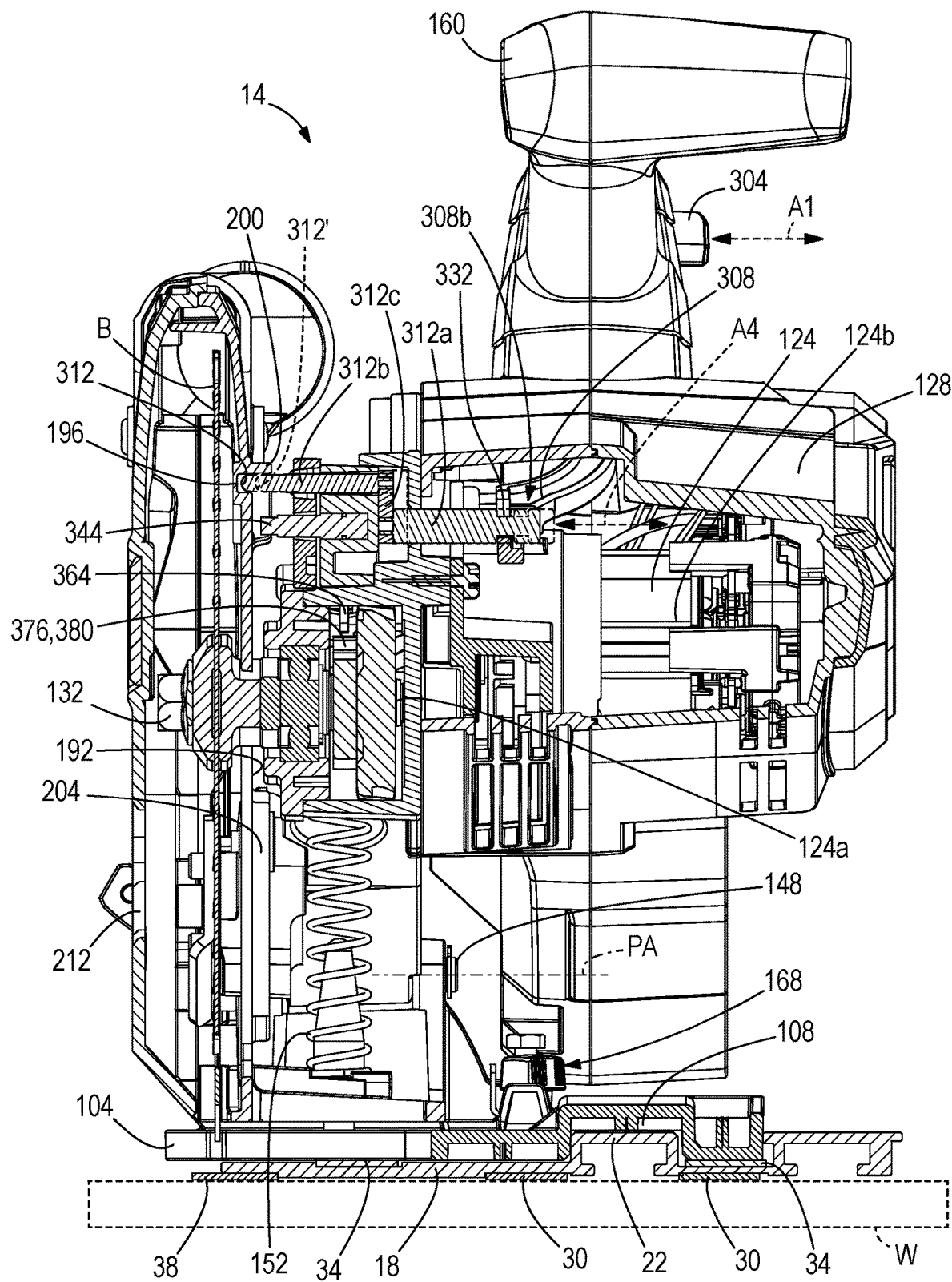
FIG. 5 is a cross-sectional view of the track saw assembly taken along section line 5-5 in FIG. 2.

FIG. 1 illustrates a track saw assembly 10 including a saw 14 and a track 18. The track 18 rests upon a workpiece W. The track 18 includes a channel 22, and the saw 14 includes a shoe 104 having a groove 108. The groove 108 engages the channel 22, and the saw 14 is translatable along a longitudinal axis LA of the track 18 to make a straight cut in the workpiece W. In some instances, the channel 22 may engage other mechanisms such as a clamp 26 which may optionally secure the track 18 to the workpiece W. The saw 14 further comprises a saw unit 116 and a blade guard 120. The blade guard 120 extends upwardly from the shoe 104. The saw unit 116 includes a motor 124 (FIG. 3) located inside a motor housing 128. The motor 124 includes a rotor 124a (FIG. 5) and a stator 124b (FIG. 5). The rotor 124a of the motor 124 is drivably coupled to a blade B by an arbor 132 (FIG. 5) with the blade B being positioned at least partially within the blade guard 120. The motor 124 is configured to rotate the blade B.

With continued reference to FIG. 1, the motor 124 selectively receives power from a power source at a power interface 136. In the illustrated embodiment, the power source may be a battery pack that is selectively coupled to the saw unit 116 at the power interface 136. Such a battery pack may be a rechargeable battery pack. The saw unit 116 further includes a trigger 140. A user operates the trigger 140 to selectively transmit power from the power source (e.g., the battery pack) to the motor 124 to rotate the blade B. The trigger 140 is configured to activate the motor 124 in response to being actuated.

Figure 2:
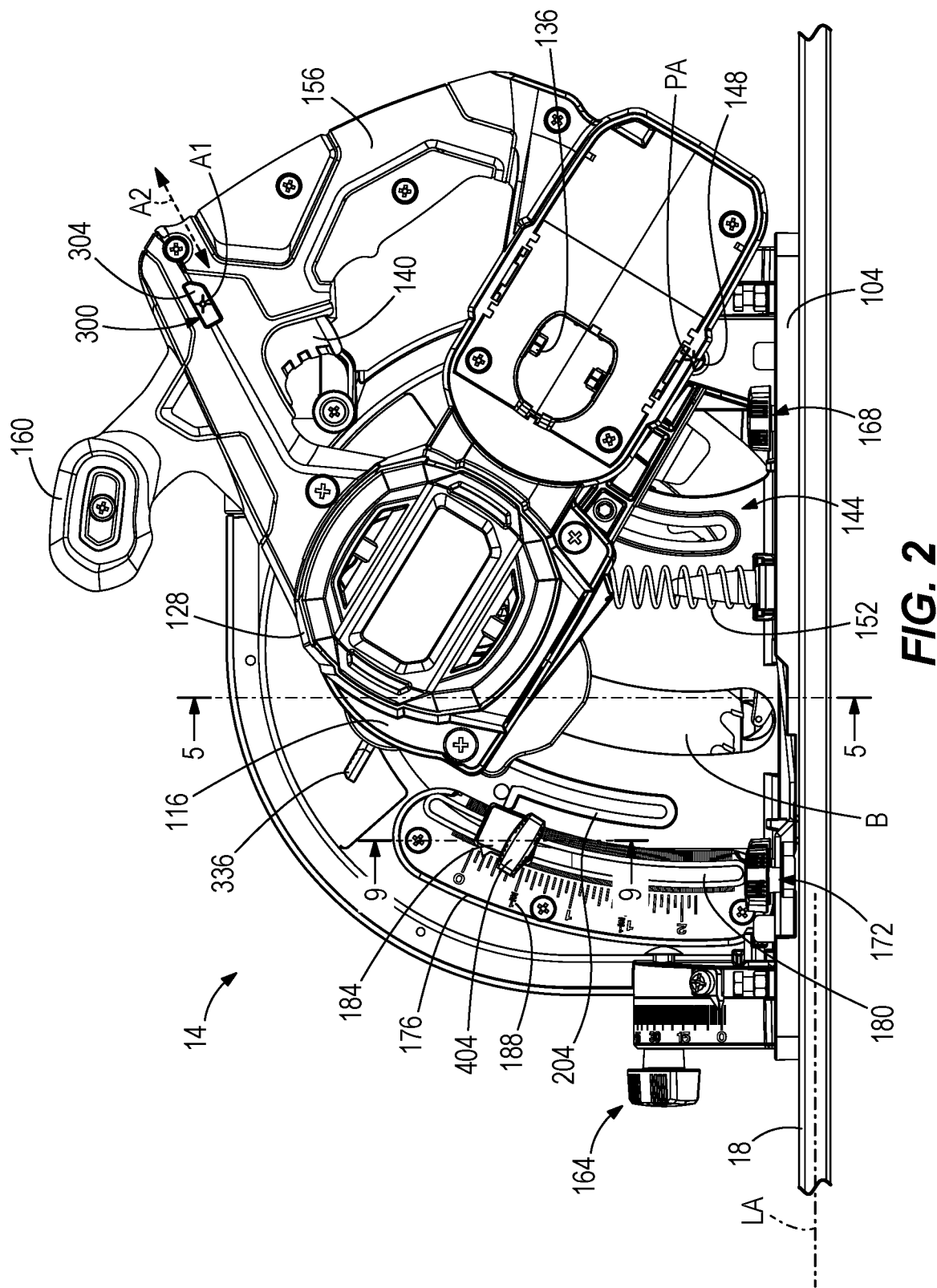
FIG. 2 is a side view of the track saw assembly of FIG. 1.

FIG. 2 shows a plunge mechanism 144 of the saw 14. The plunge mechanism 144 is configured to rotate the saw unit 116 relative to the shoe 104 about a plunge axis PA. The plunge axis PA is generally perpendicular to the longitudinal axis LA. Accordingly, the saw unit 116 is movable between a plunged position in which the blade B can make a cut in the workpiece W and a retracted position in which the blade B will not contact the workpiece W. In other words, the saw unit 116 is movable between a plunged position in which at least a portion of the blade B is positioned below the shoe 104 a retracted position in which the blade B is positioned above the shoe 104. The saw unit 116 includes the motor 124 and the motor housing 128. Accordingly, the motor housing 128 is pivotably coupled to the shoe 104 about the plunge axis PA between a raised position in which the blade B is located above the shoe 104 and a plunged position in which at least a portion of the saw blade B is located beneath the shoe 104.

The plunge mechanism 144 includes a pivot pin 148 and a spring 152. The pivot pin 148 pivotably couples the saw unit 116 to the shoe 104. The pivot pin 148 is oriented along the plunge axis PA. The spring 152 biases the saw unit 116 and thus the motor housing 128 away from the shoe 104. In other words, the spring 152 biases the saw unit 116 and thus the motor housing 128 to the retracted position. During typical use, a user may grasp at least one of a primary handle 156 and a secondary handle 160 to plunge the saw unit 116 from the retracted position towards the plunged position against the bias of the spring 152. Upon the user's release of the handle 156 and/or the secondary handle 160, the spring 152 returns the saw unit 116 to the retracted position.

As will be discussed in detail below, the saw 14 includes a lockout mechanism 300 which selectively permits actuation of the trigger 140. The lockout mechanism 300 also selectively permits plunging of the motor 124 via the plunge mechanism 144.

Figure 3:
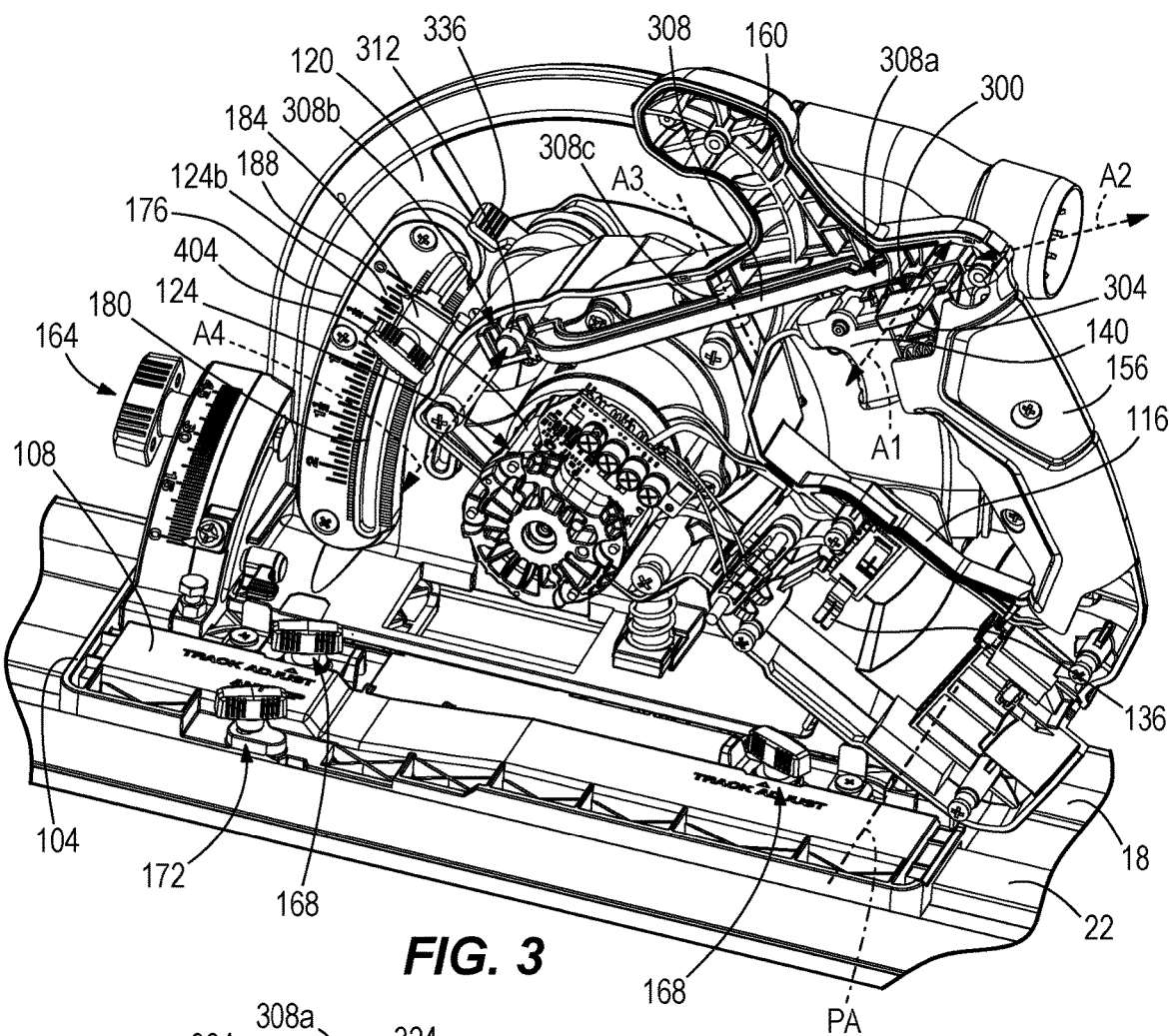
FIG. 3 is a partial cutaway, perspective view of the track saw assembly of FIG. 1 with a saw housing removed.

As illustrated in FIG. 3, the saw 14 includes a bevel mechanism 164 configured to rotate the saw unit 116 relative to the shoe 104 about a bevel axis BA. The bevel axis BA is generally parallel to the longitudinal axis LA. Accordingly, the saw unit 116 is movable between a straight position in which the blade B is configured to make a straight cut in the workpiece W and a beveled position in which the blade B is configured to make a beveled cut in the workpiece W.

FIG. 3 further illustrates that the saw 14 includes track adjustment mechanisms 168 configured to selectively adjust the interface between the groove 108 of the shoe 104 and the channel 22 of the track 18. The track adjustment mechanisms 168 are coupled to the shoe 104. The illustrated saw 14 includes one track adjustment adjacent each longitudinal end of the shoe 104. A user may adjust either of the track adjustment mechanisms 168 while the shoe 104 is supported on the track 18.

FIG. 3 further illustrates that the saw 14 includes an anti-tip mechanism 172 configured to inhibit lifting of the shoe 104 from the track 18. The anti-tip mechanism 172 is coupled to the shoe 104. The anti-tip mechanism 172 may be movable between a retracted position in which the anti-tip mechanism 172 is misaligned with the track 18 and a deployed position in which at least a portion of the anti-tip mechanism 172 is aligned with the track 18 to inhibit lifting of the shoe 104 from the track 18. The anti-tip mechanism 172 is particularly useful to inhibit lifting of the shoe 104 from the track 18 while the saw unit 116 is moved to a beveled position by the bevel mechanism 164.

Finally, FIG. 3 illustrates a depth guide 176 defining a channel 180 and a depth stop 184. The depth guide 176 is coupled to the blade guard 120. The channel 180 is arcuate in shape. The channel 180 may have an arc center aligned with the plunge axis PA. As will be described in detail regarding FIG. 9 below, the depth stop 184 is selectively movable along the channel 180 to provide a plunge stop for the saw unit 116. The depth stop 184 may provide a stop between a fully retracted position of the blade B and a fully plunged position of the blade B. Indicia 188 are provided on the depth guide 176 adjacent the channel 180. The indicia 188 indicate a corresponding depth of the blade B below the shoe 104 as the saw unit 116 is plunged along the depth guide 176.

Figure 4:
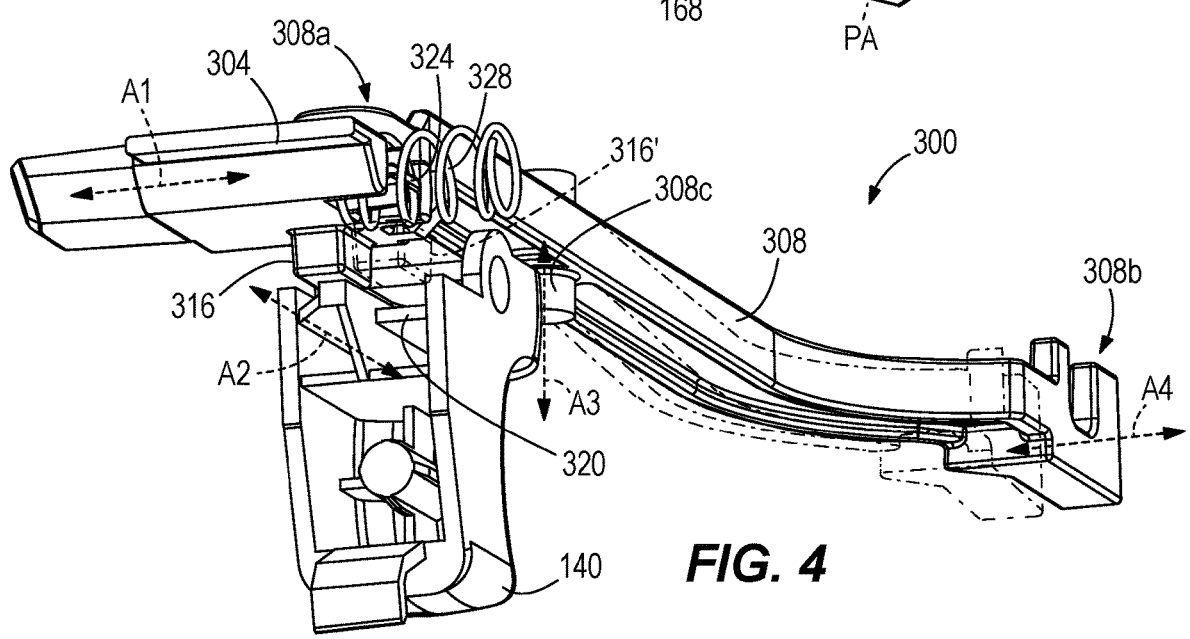
FIG. 4 is a perspective view of a lockout mechanism of the track saw assembly.

FIGS. 3 and 4 illustrate the lockout mechanism 300. The lockout mechanism 300 includes a lockout actuator 304, a lever 308, and a pin 312. The lockout actuator 304 is movable along an actuator axis A1 between a safety position in which the lockout actuator 304 inhibits actuation of the trigger 140 and a user position in which the lockout actuator 304 permits actuation of the trigger 140. As illustrated in FIG. 4, the lockout actuator 304 includes a lockout block 316. FIG. 4 illustrates the lockout block 316 in solid lines with the lockout actuator 304 in the safety position. In the safety position, the lockout block 316 is aligned with a lockout surface 320 of the trigger 140, and movement of the trigger 140 along a trigger axis A2 is inhibited. As a result, in the safety position, actuation of the trigger 140 is inhibited. FIG. 4 further illustrates a lockout block 316' in dashed lines with the lockout actuator 304 in the use position. In the use position, the lockout block 316' is misaligned with the lockout surface 320 of the trigger 140, and movement of the trigger 140 along the trigger axis A2 is permitted. As a result, in the use position, actuation of the trigger 140 is permitted. Broadly speaking, the safety position of the lockout actuator 304 disables operation of the motor 124 because the trigger 140 is inhibited from being actuated. The use position of the lockout actuator 304 enables operation of the motor 124 because the trigger 140 is permitted to be actuated.

As illustrated in FIG. 4, the lockout actuator 304 includes a spring retainer 324 configured to receive a lockout actuator spring 328. The lockout actuator spring 328 is configured to bias the lockout actuator 304 towards the safety position (e.g., to the left as viewed in FIG. 4). Accordingly, to permit actuation of the trigger 140, a user must first move the lockout actuator 304 to the use position. The lockout actuator 304 functions as a safety device to selectively permit a user the ability to actuate the motor 124.

As illustrated in FIGS. 3 and 4, the lever 308 has a first end 308a which is coupled to the lockout actuator 304 and a second end 308b opposite the first end 308a. In the illustrated embodiment, the lever 308 is provided as a see-saw lever including a fulcrum 308c positioned between the first end 308a and the second end 308b. The fulcrum 308c extends along and is rotatable about a see-saw axis A3. The see-saw axis A3 is transverse to the track 18. The fulcrum 308c is pivotably coupled to the saw unit 116 to permit pivoting movement of the first end 308a and the second end 308b relative to the fulcrum 308c. Accordingly, movement of the first end 308a of the lever 308 (e.g., along the actuator axis A1) in a first direction causes an opposite movement of the second end 308b of the lever 308 (e.g., along a pin axis A4) in an opposite, second direction.

As best illustrated in FIGS. 3 and 5, the second end 308b of the lever 308 is coupled to the pin 312. More specifically, the second end 308b of the lever 308 is coupled to a pin recess 332 of the pin 312. The pin recess 332 (i.e., the "circumferential recess") extends circumferentially along the pin 312 to provide an engagement structure between the second end 308b of the lever 308 and the pin 312. The second end 308b of the lever 308 is received within the pin recess 332. Other engagement structures are possible.

With continued reference to FIGS. 3 and 5, as the lockout actuator 304 is moved from the safety position (lockout block 316 aligned with lockout surface 320) to the use position (lockout block 316' misaligned from lockout surface 320) along the actuator axis A1, the first end 308a of the lever 308 is carried with the lockout actuator 304. The second end 308b of the lever 308 pivoted about the see-saw axis A3 and the pin 312 is moved along the pin axis A4 from a first position corresponding with the safety position toward a second position corresponding with the use position. The pin axis A4 is generally parallel to the actuator axis A1. Both the actuator axis A1 and the pin axis A4 are generally perpendicular from the blade B and the blade guard 120. The first position of the pin 312 is illustrated in solid lines in FIG. 5. The second position of the pin 312 is illustrated in dashes lines as a pin 312' in FIG. 5.

Figure 6:
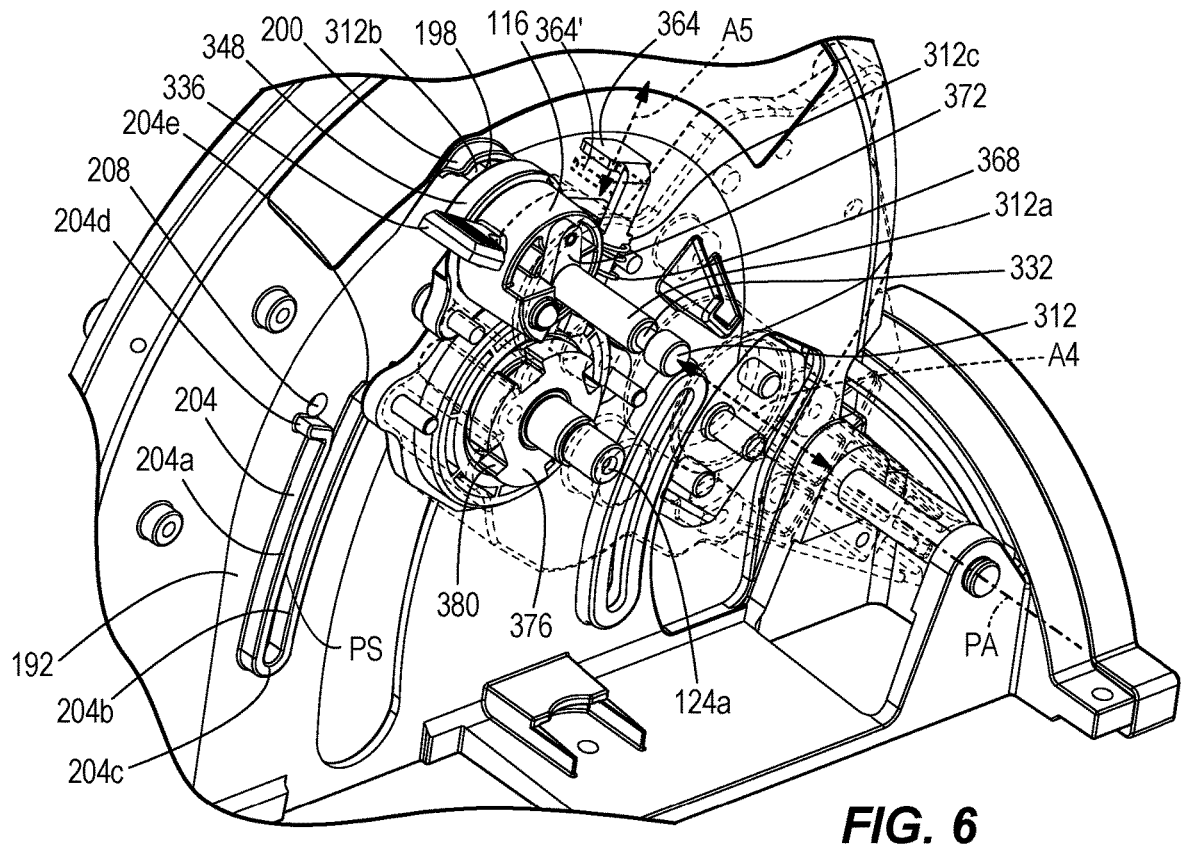
FIG. 6 is a perspective view of a portion of the saw of FIG. 1.
Figure 8:
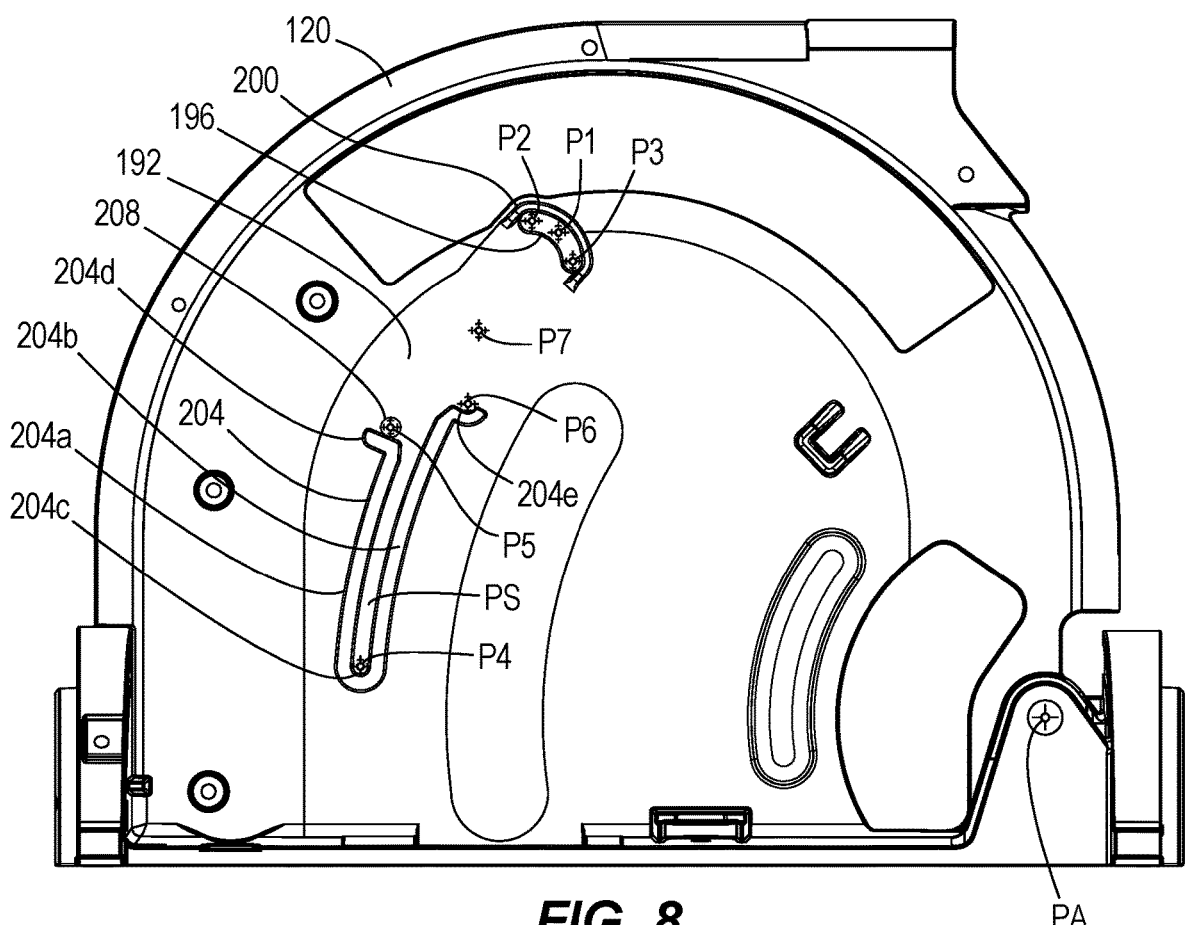
FIG. 8 is a side view of a blade guard of the saw of FIG. 1.

With continued reference to FIG. 5 and further reference to FIGS. 6 and 8, the blade guard 120 defines a generally planar surface 192, a slot 196, a first protrusion 200 (i.e., protrusion), a second protrusion 204, and a blade exchange blind bore 208 (FIG. 6). The slot 196 is arcuate in shape (FIG. 8) and is recessed into the planar surface 192 (FIG. 5). The planar surface 192 is oriented in a direction generally perpendicular to the pin 312. When the pin 312 is in the first position (as shown in FIG. 5), the pin 312 is received within (i.e., depressed into) the slot 196. In some instances, when the pin 312 is in the first position (as illustrated as the pin 312, FIG. 5), the pin is maintained within the slot 196. In this position, the pin 312 abuts the slot 196 to inhibit plunging of the saw unit 116, and thus the motor 124 and the blade B relative to the shoe 104. The lockout actuator 304 is coupled to the lever 308 which causes movement of the pin 312. The first position of the pin 312 corresponds with the safety position of the lockout actuator 304 in which the lockout block 316 is aligned with the lockout surface 320 of the trigger 140 (FIG. 4), and movement of trigger along the trigger axis A2 (i.e., actuation of the trigger) is inhibited. Conversely, when the pin 312 is in the second position (as illustrated as the pin 312', FIG. 5), the pin 312' is removed from (i.e., raised from) the slot 196 to a position aligned with the planar surface 192. In this second position, the pin 312 permits plunging of the saw unit 116, and thus the motor 124 and the blade B relative to the shoe 104. The second position of the pin 312 corresponds with the use position of the lockout block 316' (FIG. 4) in which the lockout block 316' is misaligned with the lockout surface 320, and movement of the trigger 140 along the trigger axis A2 is permitted. Accordingly, the lockout actuator 304 functions as both a trigger lock and a plunge lock.

As best shown in FIGS. 6 and 8, the first protrusion 200 and the second protrusion 204 protrude from the planar surface 192. More specifically, one or both of the first protrusion 200 and the second protrusion 204 may extend laterally from the planar surface 192. The first protrusion 200 is arcuate in shape in correspondence with the arcuate shape of the slot 196. The first protrusion 200 is positioned on a side of the slot 196 opposite the second protrusion 204. The first protrusion 200 is provided adjacent the slot 196. When the pin 312 is in the second position (pin 312', FIG. 5), the pin 312' is removed from (i.e., raised from) the slot 196, but remains in alignment with and in some situations in contact with the first protrusion 200 such that abutment between the pin 312' and the first protrusion 200 inhibits movement of the motor housing 128 further away from the shoe 104 beyond the raised position. The second protrusion 204 is provided at a distance from the slot 196.

The second protrusion 204 includes a first sidewall 204a, a second sidewall 204b, an end wall 204c, a blade exchange stop 204d (i.e., a "first stop"), and a scoring stop 204e (i.e., a "second stop"). The first sidewall 204a and the second sidewall 204b extend parallel to each other. The first sidewall 204a and the second sidewall 204b are arcuately shaped with an arc center provided by the plunge axis PA. The first sidewall 204a is further from the plunge axis PA than the second sidewall 204b. The end wall 204c connects the first sidewall 204a to the second sidewall 204b at a distal position spaced from the slot 196. The blade exchange stop 204d is coupled to the first sidewall 204a and extends away from both the first sidewall 204a and the second sidewall 204b in a direction generally away from the plunge axis PA. The blade exchange blind bore 208 is provided adjacent the intersection of the first sidewall 204a and the blade exchange stop 204d on a side of the blade exchange stop 204 closer to the slot 196. With reference to FIG. 8, the scoring stop 204e is generally arcuately shaped with one end of the arcuate scoring stop 204e coupled to an end of the second sidewall 204b closest to the slot 196 and the other end of the arcuate scoring stop 204e closer to the plunge axis PA than the other end of the arcuate scoring stop 204e.

FIG. 5 further illustrates a high-friction member 30, a low-friction member 34, and an insert plate 38 of the track 18. In the illustrated embodiment, the track 18 includes a high-friction member 30 positioned between the track 18 and the workpiece W. The high-friction member 30 is configured to inhibit movement of the track 18 relative to the workpiece W once the track 18 is positioned upon the workpiece W. The high-friction member 30 may be made of a different material than the track 18. In some examples, the high-friction member 30 may be made of an elastomeric material, such as rubber, or other similar materials. The illustrated track 18 includes two high-friction members 30 on opposite lateral sides of the channel 22.

The track 18 further comprises the low-friction member 34 positioned between the track 18 and the shoe 104 when the saw 14 is supported upon the track 18. The low-friction member 34 may inhibit friction between the shoe 104 and the track 18 during movement of the saw 14 along the track 18. The low-friction member 34 may be made of a different material than the track 18. In some examples, the low-friction member 34 may be comprise metal or other similar materials. The illustrated track 18 includes two low-friction members 34 on opposite lateral sides of the channel 22.

Finally, the track 18 further comprises the insert plate 38. The insert plate 38 is positioned on a lateral end of the track 18 corresponding with the blade B. The insert plate 38 may have a similar height as the high-friction member 30 such that the track 18 is co-planar with the workpiece W. In the illustrated embodiment, the insert plate 38 may be cut during a first use of the track saw assembly 10. The insert plate 38 can thus inhibit a lateral clearance between the blade B and the track 18. After the first use, the blade B may travel parallel to the longitudinal axis LA and parallel to the insert plate 38 to make a straight cut in the workpiece along the track 18.

Figure 7:
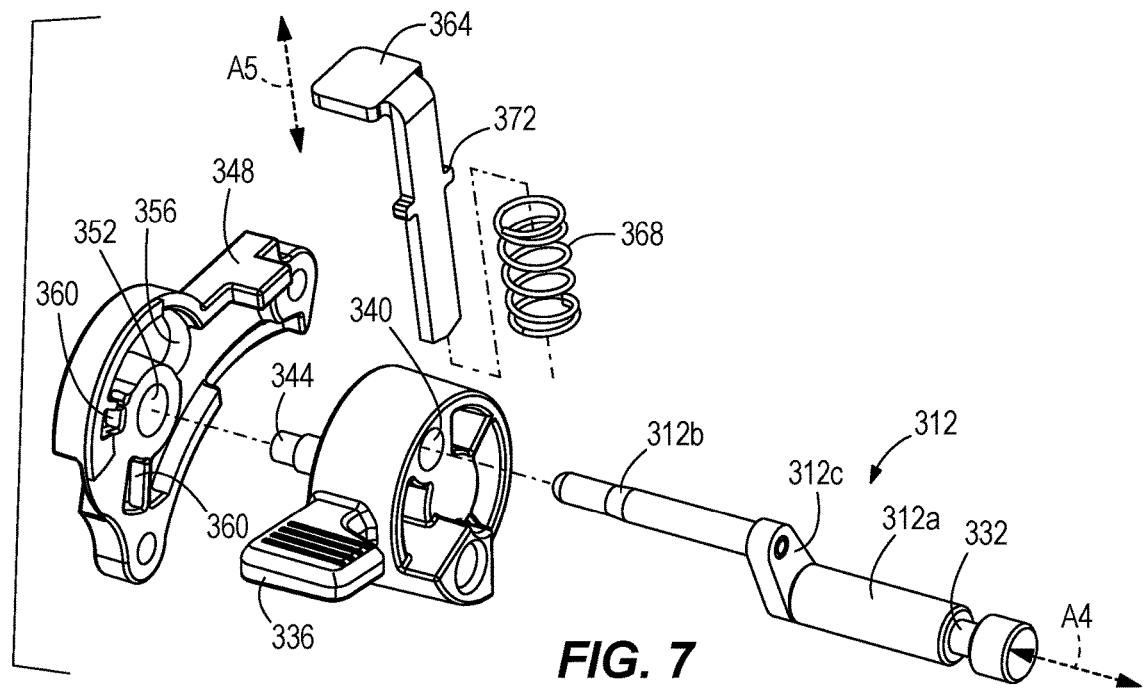
FIG. 7 is an exploded view of a mode selector assembly of the saw of FIG. 1.

FIGS. 6 and 7 illustrate further components of the lockout mechanism 300. The lockout mechanism 300 includes a mode selector 336. The mode selector 336 is pivotably coupled to the saw unit 116. The mode selector 336 is plunged with the saw unit 116 by the plunge mechanism 144. The mode selector 336 includes a pin hole 340 which receives the pin 312. With reference to FIG. 7, the pin 312 is a compound pin including a first portion 312a and a second portion 312b coupled to each other by a coupling arm 312c. The first portion 312a includes the pin recess 332 (i.e., a "circumferential recess"), and the first portion 312a is directed along the pin axis A4. The second portion 312b is received within the pin hole 340, and the second portion 312b is misaligned with the pin axis A4. In other words, the second portion 312b is misaligned from the first portion 312a. The arcuate shape of the slot 196 is defined by a radius extending between the pin axis (i.e., a "rotational axis") and the second portion 312b of the pin 312. The mode selector 336 further includes a mode selector stop 344. As illustrated in FIG. 5, the mode selector stop 344 is positioned beyond the planar surface 192 of the blade guard 120, but within the bounds of the end wall 204c of the second protrusion 204.

With continued reference to FIG. 7, the mode selector 336 and the pin 312 are each received by a mode selector receiver 348. The mode selector receiver 348 includes a hole 352 and an arcuate hole 356. The hole 352 receives the mode selector stop 344. The arcuate hole 356 receives the second portion 312b of the pin 312. The mode selector receiver 348 further includes detents 360 configured to hold the mode selector 336 in a desired rotational position relative to the mode selector receiver 348. The detents 360 may engage a corresponding geometry of the mode selector 336. The mode selector receiver 348 is pivotably coupled to the saw unit 116, and the mode selector 336 and the pin 312 are pivotable relative to the mode selector receiver 348.

FIGS. 6 and 7 further illustrate a spindle lock 364 and a spindle 376 which is coupled to the rotor 124a. The spindle lock 364 is separate from the lockout mechanism 300. The spindle lock 364 is movable along a spindle lock axis A5 between a use position (FIG. 6) in which the spindle lock 364 is removed from the spindle 376 and a blade exchange position (dashed lines spindle lock 364', FIG. 6) in which the spindle lock 364 is coupled to the spindle 376 to arrest motion of the rotor 124a. In other words, in the use position (FIG. 6) of the spindle lock 364, the motor 124 is rotatable, and in the blade exchange position (dashed lines spindle lock 364', FIG. 6), rotation of the motor 124 is prevented. The spindle 376 includes a plurality of spindle channels 380 configured to receive the spindle lock 364. The spindle lock 364 is biased towards the use position (FIG. 6) by a spindle lock spring 368. A spindle lock retainer 372 is biased by the spindle lock spring 368 against the saw unit 116 to inhibit separation of the spindle lock 364 from the saw unit 116.

FIG. 8 illustrates a plurality of positions which the mode selector 336 and the pin 312 can be positioned for different operations of the saw 14. A user may rotate the mode selector 336 to move the pin 312 to the desired position within the arcuate hole 356. Positions P1-P3 are provided along the slot 196 and adjacent the first protrusion 200. For positions P1-P3, when the lockout actuator 304 is in the safety position, the pin 312 is provided (i.e., positioned) within the slot 196, and the pin 312 is inhibited from plunging beyond the slot 196 and towards the second protrusion 204. Once the lockout actuator 304 is moved to the use position, the pin 312 is removed from the slot 196, and the saw unit 116 is movable (i.e., capable of being plunged) in a direction from the slot 196 and towards the second protrusion 204. Positions P4-P6 are provided against the second protrusion 204. The protrusion 204 provides a stop for the pin 312 to abut against as the saw unit 116 is plunged. Position P7 is provided at an intermediate position between the slot 196 and the second protrusion 204.

Positions P1 and P4 relate to a plunge position of the pin 312. When a user desires to plunge the saw unit 116 relative to the shoe 104, the user actuates the mode selector 336 to the position P1. At this time, the user actuates the lockout actuator 304 to move the pin 312 out of the slot 196. Assuming that the depth stop 184 does not impede the travel of the saw unit 116, the saw unit 116 is then free to plunge between P1 and P4. Between positions P1 and P4, the pin 312 is slidable into a plunge slot PS (FIG. 8) defined by the second protrusion 204. More specifically, the plunge slot PS is defined by the first sidewall 204a, the second sidewall 204b, and the end wall 204c. Position P4 relates to a maximum plunge depth of the blade B. When plunging between position P1 and position P4, the pin 312 travels along an arcuate path between position P1 and position P4. The arcuate path between position P1 and position P4 passes through position P7. Once reaching position P4, the saw unit 116 is inhibited from further plunging by the end wall 204c. In certain configurations, the trigger 140 can be actuated while plunging between positions P1 and P4 such that the blade B can make a corresponding cut in the workpiece W.

Positions P2 and P5 relate to a blade exchange position of the pin 312. When a user desires to plunge the saw unit 116 relative to the shoe 104 to a position corresponding with a blade exchange, the user actuates the mode selector 336 to the position P2. At this time, the user actuates the lockout actuator 304 to move the pin 312 out of the slot 196. Assuming that the depth stop 184 does not impede the travel of the saw unit 116, the saw unit 116 is then free to plunge between positions P2 and P5. As described in detail below, position P5 defines a blade exchange plunge depth of the blade B that is less than the maximum plunge depth defined by position P4. When plunging between position P2 and position P5, the pin 312 travels along an arcuate path between position P2 and P5. Once reaching position P5, the saw unit 116 is inhibited from further plunging by the blade exchange stop 204d.

Position P5 corresponds with a blade depth required to align the arbor 132 with a blade exchange window 212 (FIGS. 5, 9) for completing an exchange of the blade B. Once positioned at P5, the pin 312 may be received within the blade exchange blind bore 208. As previously mentioned, the blade exchange blind bore 208 may be recessed in the planar surface 192 of the blade guard 120, and the blade exchange blind bore 208 may be positioned adjacent the blade exchange stop 204d (i.e., the "first stop"). The lockout actuator spring 328 may bias the pin 312 into position within the blade exchange blind bore 208. The lockout actuator spring 328 will also bias the lockout block 316 into alignment with the lockout surface 320 to inhibit actuation of the trigger 140 during the blade exchange. The pin 312 is insertable into the blade exchange blind bore 208 in response to the lockout actuator spring 328 rebounding to return the lockout actuator 304 to the safety position. With the pin 312 received in the blade exchange blind bore 208, the user can then depress the spindle lock 364 against the bias of the spindle lock spring 368 and into the blade exchange position where the spindle lock 364 is received in a spindle channel 380 of the spindle 376. The user can then loosen the arbor 132, remove the blade B from the saw unit 116, and attach a new blade B to the saw unit 116. The arbor 132 can then be replaced. The user can then depress the lockout actuator 304 to release the pin 312 from the blade exchange blind bore 208. The saw unit 116 can then be retracted back to position P2.

Positions P3 and P6 correspond with a blade depth desirable for making a scoring cut in the workpiece W. Scoring cuts are frequently made in workpieces W to check the position of the track 18 on the workpiece W or for other uses. While a plurality of blade depths for making scoring cuts may be suitable, the proposed position P6 relates to a scoring depth in which the blade B extends approximately 2 mm into the workpiece W (though position P6 could relate to other depths in other embodiments). When a user desires to plunge the saw unit 116 relative to the shoe 104 to a position corresponding with a scoring cut, the user actuates the mode selector 336 to the position P3. At this time, the user actuates the lockout actuator 304 to move the pin 312 out of the slot 196. Assuming that the depth stop 184 does not impede the travel of the saw unit 116, the saw unit 116 is then free to plunge between positions P2 and P6. Position P6 relates to a scoring plunge depth of the blade B that is less than the blade exchange depth defined by position P5. The scoring plunge depth defined by position P6 is also less than the maximum plunge depth defined by position P4. When plunging between position P3 and position P6, the pin 312 travels along an arcuate path between position P3 and position P6. Once reaching position P6, the saw unit 116 is inhibited from further plunging by the scoring stop 204e. The trigger 140 can be actuated while plunging between positions P3 and P6 such that the blade B can make a corresponding cut in the workpiece W.

Position P7 relates to a partial plunge depth position of the pin 312. When a user desires to plunge the saw unit 116 a desired partial plunge depth P7 relative to the shoe 104, the user actuates the mode selector 336 to the position P1. The partial plunge depth P7 is between the bounds of position P1 and position P4. The user then can move the depth stop 184 along the channel 180 such that the depth stop 184 is aligned with the indicia 188 corresponding with the desired depth. At this time, the user can actuate the lockout actuator 304 to move the pin 312 out of the slot 196. Once reaching position P7, the saw unit 116 is inhibited from further plunging by the depth stop 184. In the illustrated embodiment, the depth stop 184 is configured to abut the saw unit 116 at the desired depth P7. More specifically, the depth stop 184 is configured to abut the mode selector receiver 348 once the saw unit 116 reaches the desired depth P7.

Figure 9:
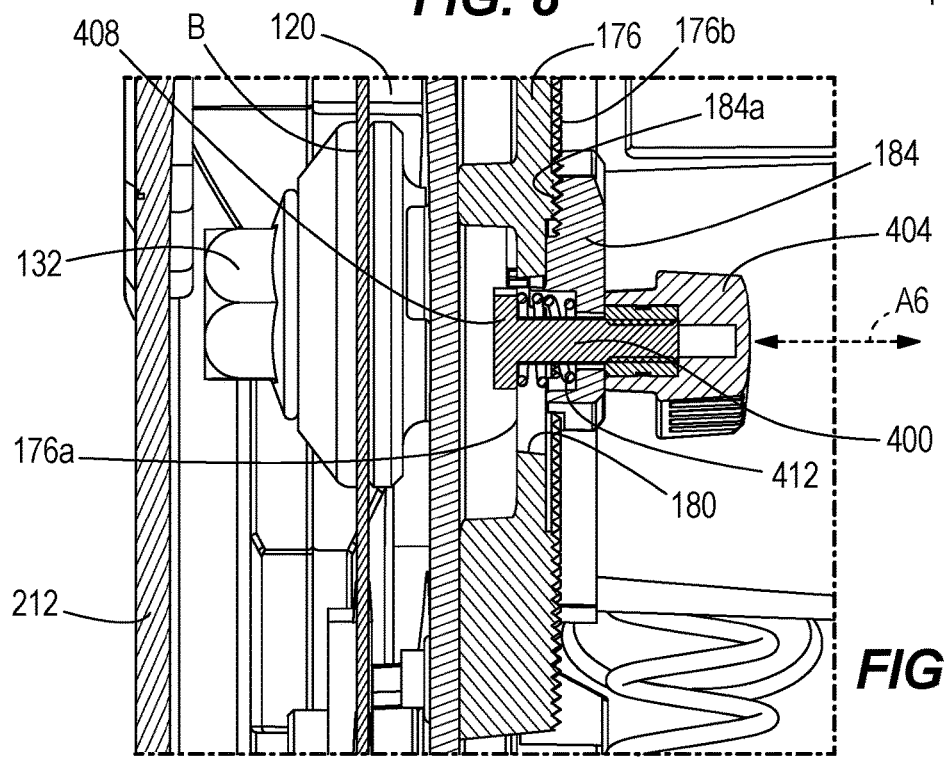
FIG. 9 is a cross-sectional view of a depth stop of the saw taken along section line 9-9 in FIG. 2.

FIG. 9 provides further detail on the movement of the depth stop 184 along the depth guide 176. The depth guide 176 includes an inner surface 176a that faces towards the blade guard 120. The depth guide 176 further includes teeth 176b which face away from the blade guard 120. The depth stop 184 further includes a shaft 400 coupled to a knob 404 at one end, and a plate 408 at an opposite end. The depth stop 184 is biased by a spring 412 into engagement with the depth guide 176. More specifically, the depth stop 184 includes teeth 184a which are biased into engagement with the teeth 176b of the depth guide 176. When a user desires to move the position of the depth stop 184 along the depth guide 176, the user pulls the depth stop 184 along a depth stop axis A6 and away from the depth guide 176. This direction extends to the right as viewed in FIG. 9. If the user pulls the depth stop 184 far enough from the depth guide 176, the plate 408 will abut the inner surface 176a of the depth guide 176 to inhibit removal of the depth stop 184 from the depth guide 176. Once the depth stop 184 is positioned at the desired location along the depth guide 176, the user releases the knob 404, and the spring 412 biases the depth stop 184 into engagement with the depth guide 176. With the depth stop 184 engaging the depth guide 176, the depth stop 184 is configured to restrict (i.e., inhibit) movement of the saw unit 116 and thus the motor housing 128 to a desired plunge depth of the blade B corresponding with P7 (up to and including P4). Other arrangements for selectively moving the depth stop 184 along the depth guide 176 are possible.

In each of these positions, the mode selector stop 344 is aligned with the end wall 204c of the second protrusion 204 to inhibit excess plunging of the saw unit 116 relative to the shoe 104. In other words, the mode selector stop 344 is positioned somewhere between P1 and P4 while the pin 312 is moved between each of the positions P1-P7.

Various features of the invention are set forth in the following claims.

What is claimed is:

1. A saw comprising:
   a shoe;
   a motor housing pivotably coupled to the shoe and movable between a raised position in which a saw blade is located above the shoe and a plunged position in which at least a portion of the saw blade is located beneath the shoe;
   a motor located within the motor housing configured to rotate the saw blade;
   a trigger configured to activate the motor in response to being actuated; and
   a lockout mechanism including
      a lockout actuator movable between
         a safety position in which the lockout actuator inhibits actuation of the trigger, and
         a use position in which the lockout actuator permits actuation of the trigger,
      a lever having a first end coupled to and movable with the lockout actuator, the first end being movable along an actuator axis, and an opposite, second end movable along a pin axis, the actuator axis and the pin axis being transverse to the saw blade, and
      a pin coupled to the second end of the lever and movable with the lever between
         a first position corresponding with the safety position of the lockout actuator and configured to inhibit the motor housing from being moved from the raised position toward the plunged position, and
         a second position corresponding with the use position of the lockout actuator and configured to permit the motor housing to be moved from the raised position toward the plunged position.

2. The saw of claim 1, further comprising a spindle lock separate from the lockout mechanism, wherein the spindle lock is movable between a use position, in which the motor is rotatable, and a blade exchange position, in which rotation of the motor is prevented.

3. The saw of claim 2, further comprising a spring that biases the spindle lock toward the use position.

4. The saw of claim 1, wherein the pin includes a first portion, a second portion misaligned from the first portion, and an arm coupling the first portion and the second portion.

5. The saw of claim 1, wherein the pin includes a circumferential recess in which the second end of the lever is received.

6. The saw of claim 1, wherein the lockout actuator includes a lockout block that is aligned with a lockout surface of the trigger when the lockout actuator is in the safety position to inhibit movement of the trigger to activate the motor, and wherein the lockout block is misaligned from the lockout surface when the lockout actuator is in the use position.

7. The saw of claim 1, further comprising a spring that biases the lockout actuator towards the safety position.

8. The saw of claim 1, wherein the lever includes a fulcrum positioned between the first end and the second end, and wherein movement of the first end of the lever in a first direction causes movement of the second end of the lever in an opposite, second direction.

9. The saw of claim 1, further comprising a blade guard extending upward from the shoe, the blade guard having a slot, wherein in the first position, the pin is positioned within the slot, and wherein in the second position, the pin is removed from the slot.

10. The saw of claim 9, wherein the blade guard defines a planar surface oriented perpendicular to the pin, and wherein the slot is recessed into the planar surface.

11. A saw comprising:
   a shoe;
   a motor housing pivotably coupled to the shoe and movable between a raised position in which a saw blade is located above the shoe and at least one plunged position in which at least a portion of the saw blade is located beneath the shoe;
   a blade guard in which the saw blade is at least partially received, the blade guard including a planar surface and a slot recessed into the planar surface,
   a motor located within the motor housing configured to rotate the saw blade;
   a lockout mechanism including
      a lockout actuator, and
      a pin coupled to the lockout actuator and movable by the lockout actuator between
         a first position, in which the pin is received within the slot to inhibit the motor housing from being moved from the raised position toward the at least one plunged position, and
         a second position, in which the pin is removed from the slot to permit the motor housing to be moved from the raised position toward the at least one plunged position; and a mode selector operable to adjust the pin, while within the slot and with the lockout actuator in the first position, between each of
  a plunge position, in which the pin, when in the second position, is configured to permit the motor housing to be moved from the raised position toward a first plunged position defining a maximum plunge depth of the saw blade,
  a blade exchange position, in which the pin, when in the second position, is configured to permit the motor housing to be moved from the raised position toward a second plunged position defining a blade exchange plunge depth of the saw blade that is less than the maximum plunge depth, and
  a scoring position, in which the pin, when in the second position, is configured to permit the motor housing to be moved from the raised position toward a third plunged position defining a scoring plunge depth of the saw blade that is less than the blade exchange depth.

12. The saw of claim 11, wherein the blade guard extends upward from the shoe and encloses at least a portion of the saw blade.

13. The saw of claim 12, wherein the slot is a first slot in the blade guard, wherein the blade guard includes a protrusion laterally extending from the planar surface, and wherein the protrusion defines a second slot in which the pin is slidable, when the mode selector is in the plunge position, to define the maximum plunge depth of the saw blade.

14. The saw of claim 13, wherein the protrusion includes a first stop against which the pin is abuttable, when the mode selector is in the blade exchange position, to define the blade exchange plunge depth of the saw blade.

15. The saw of claim 14, wherein the protrusion includes a second stop against which the pin is abuttable, when the mode selector is in the scoring position, to define the scoring plunge depth of the saw blade.

16. The saw of claim 14, further comprising a trigger configured to activate the motor in response to being actuated, wherein the lockout actuator is movable between a safety position in which the lockout actuator inhibits actuation of the trigger and a use position in which the lockout actuator permits actuation of the trigger, wherein the lockout mechanism further comprises a spring that biases the lockout actuator towards the safety position, and wherein the blade guard includes a bore adjacent the first stop into which the pin is insertable in response to the spring rebounding to return the lockout actuator to the safety position.

17. The saw of claim 12, wherein the pin includes a first portion, a second portion misaligned from the first portion, and an arm coupling the first portion and the second portion.

18. The saw of claim 17, wherein the mode selector is rotatable about a rotational axis between the plunge position, the blade exchange position, and the scoring position, wherein the second portion of the pin is parallel to the rotational axis, and wherein the slot has an arcuate shape defined by a radius between the rotational axis and the second portion of the pin.

19. The saw of claim 12, wherein the saw further comprises a depth guide coupled to the blade guard and a depth stop selectively movable along the depth guide, the depth stop being configured to restrict movement of the motor housing to a desired plunge depth of the saw blade.

20. The saw of claim 19, further comprising a spring that biases the depth stop into engagement with the depth guide to lock the depth stop to the depth guide.

21. The saw of claim 11, wherein the motor housing is pivotably coupled to the shoe, and pivotable relative to the shoe, between the raised position and the at least one plunged position, and wherein the saw further comprises a spring positioned between the shoe and the motor housing to bias the motor housing away from the shoe and toward the raised position.

22. The saw of claim 21, wherein the blade guard further comprises a protrusion laterally extending from the planar surface, and wherein the protrusion is positioned adjacent the slot such that abutment between the pin and the protrusion inhibits movement of the motor housing further away from the shoe beyond the raised position.

23. A track saw assembly comprising:
  a saw including
    a shoe;
    a motor housing pivotably coupled to the shoe and movable between a raised position in which a saw blade is located above the shoe and at least one plunged position in which at least a portion of the saw blade is located beneath the shoe;
    a motor located within the motor housing configured to rotate the saw blade;
    a trigger configured to activate the motor in response to being actuated; and
    a lockout mechanism including
    a lockout actuator movable between
    a safety position in which the lockout actuator inhibits actuation of the trigger, and
    a use position in which the lockout actuator permits actuation of the trigger,
    a lever having a first end coupled to and movable with the lockout actuator, the first end being movable along an actuator axis, and an opposite, second end movable along a pin axis, the actuator axis and the pin axis being transverse to the saw blade, and
    a pin coupled to the second end of the lever and movable with the lever between
    a first position corresponding with the safety position of the lockout actuator and configured to inhibit the motor housing from being moved from the raised position toward the at least one plunged position, and
    a second position corresponding with the use position of the lockout actuator and configured to permit the motor housing to be moved from the raised position toward the at least one plunged position; and
    a mode selector operable to adjust the pin between
    a plunge position, in which the pin is configured to permit the motor housing to be moved from the raised position toward a first plunged position defining a maximum plunge depth of the saw blade,
    a blade exchange position, in which the pin is configured to permit the motor housing to be moved from the raised position toward a second plunged position defining a blade exchange plunge depth of the saw blade that is less than the maximum plunge depth; and
  a track along which the shoe is slidable to perform a cutting operation with the saw on a workpiece upon which the track is supported.

24. The track saw assembly of claim 23, wherein the motor housing is pivotably coupled to the shoe, and pivotable relative to the shoe, between the raised position and the at least one plunged position, and wherein the saw further comprises a spring positioned between the shoe and the motor housing to bias the motor housing away from the shoe and toward the raised position.

25. The track saw assembly of claim 23, wherein the mode selector is further operable to adjust the pin to a scoring position in which the pin is configured to permit the motor housing to be moved from the raised position toward a third plunged position defining a scoring plunge depth of the saw blade that is less than the blade exchange depth.

* * * * *